(12) United States Patent
Mueller et al.

(10) Patent No.: US 6,382,533 B1
(45) Date of Patent: May 7, 2002

(54) FUEL INJECTION VALVE

(75) Inventors: Martin Mueller, Möglingen; Anh Tuan Hoang, Tamm; Frank Dallmann, Kornwestheim; Jens Pohlmann, Schwieberdingen; Martin Buehner, Backnang; Peter Land, Pettstadt; Norbert Keim, Löchgau, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/673,946

(22) PCT Filed: Oct. 28, 1999

(86) PCT No.: PCT/DE99/03461

§ 371 Date: Dec. 21, 2000

§ 102(e) Date: Dec. 21, 2000

(87) PCT Pub. No.: WO00/50766

PCT Pub. Date: Aug. 31, 2000

(30) Foreign Application Priority Data

Feb. 24, 1999 (DE) .......................... 199 07 899

(51) Int. Cl.[7] .............................. B05B 1/30; F02M 51/00
(52) U.S. Cl. .................. 239/585.1; 239/533.2; 239/533.12; 239/585.2; 239/585.3; 239/585.4; 239/585.5; 239/461; 239/463; 239/584
(58) Field of Search ................. 239/533.1, 533.2, 239/533.3, 533.9, 533.11, 533.12, 533.14, 533.15, 583, 584, 585.1, 585.2, 585.3, 585.4, 585.5, 461, 462, 463, 464, 483, 490, 491, 492, 494, 496

(56) References Cited

U.S. PATENT DOCUMENTS

| 4,254,915 A | * | 3/1981 | Müller |
| 4,595,144 A | * | 6/1986 | Wiegand et al. |
| 5,875,972 A | * | 3/1999 | Ren et al. |
| 5,878,962 A | * | 3/1999 | Shen et al. |

FOREIGN PATENT DOCUMENTS

| DE | 22 32 686 | | 1/1974 |
| DE | 28 41 967 | | 4/1980 |
| DE | 40 35 317 | | 10/1991 |
| DE | 197 57 299 | | 6/1998 |
| EP | 0 909 920 | | 4/1999 |
| JP | 62-48958 | * | 3/1987 |
| JP | 07 119 584 | | 5/1995 |
| JP | 2000297727 | * | 10/2000 |

* cited by examiner

Primary Examiner—Robin O. Evans
(74) Attorney, Agent, or Firm—Kenyon & Kenyon

(57) ABSTRACT

A fuel injector, in particular a high-pressure injector for directly injecting fuel into a combustion chamber of a mixture-compression, spark-ignition internal combustion engine, which is characterized by the fact that at a valve seat element a conical section is formed having a valve seat surface, to which an outlet opening is immediately joined in the downstream direction. The outlet opening has an intake plane, whose central point lies on the valve longitudinal axis, whose central axis, however, runs diagonally with respect to valve longitudinal axis. A disk-shaped swirl element is arranged upstream of the valve seat element. The swirl element has swirl channels, which are distributed over the periphery, the swirl channels having varying geometries or dimensions.

22 Claims, 5 Drawing Sheets

FUEL INJECTION VALVE

FIELD OF THE INVENTION

The present invention relates to a fuel injector.

BACKGROUND OF THE INVENTION

From German published Patent Application No. 197 57 299, a fuel injector is described in which a fuel injection chamber is arranged downstream of a valve seat. For opening and closing the valve, an axially movable valve needle cooperates with the valve seat, the needle having a conical closing segment corresponding to the contour of the valve seat. Upstream of the valve seat, on the exterior periphery of the valve needle, a diagonally running swirl channel is provided. The swirl channel empties into an annular swirl chamber, which is formed between the valve needle and an external valve housing. From this swirl chamber, the fuel is conveyed to the valve seat. From the fuel injection chamber downstream of the valve seat, the fuel flows into an outlet opening, which begins slightly offset from the center of the base surface of the fuel injection chamber and runs downstream diagonally with respect to the valve longitudinal axis.

SUMMARY OF THE INVENTION

The fuel injector according to the present invention, has the advantage that in a particularly simple manner, a cost-efficient compensation is achieved for the unequal distribution of fuel in the spray to be spray-discharged arising in response to a chosen inclination of an outlet opening, towards the goal of an equal distribution of a spray that is diagonally spray-discharged. Using the fuel injector according to the present invention, very good atomization and very precise spray discharging of the fuel are achieved, e.g., directly into a cylinder of an internal combustion engine. A particularly uniform front of the spray-discharged spray is attained. In addition, it is avoided that individual streams in the spray have great speed and depth of penetration.

It is advantageous to achieve the above-mentioned compensation of the irregularity of the spray using an outlet opening, the central point of whose intake plane lies on the valve longitudinal axis, the intake plane thus having a central intake. In this manner, however, in response to the preselected small diameter of the valve seat in the area of its seat contact line, in order to avoid large hydraulic forces being exerted on the valve needle, relatively large diameters can be selected for the outlet opening, permitting a large flow of fuel. In comparison with the off-center solutions, flow-through dispersions can be better avoided.

In a particularly advantageous manner, swirling fuel is fed to the valve seat in the valve seat element over an extremely short flow route. This very short flow route is also guaranteed to the extent that the outlet opening begins immediately at the end of the valve seat surface, avoiding any collector spaces.

The disk-shaped swirl element has a very simple structure and can therefore be shaped in a simple manner. It is the task of the swirl element to generate a swirl or rotary motion in the fuel. Since the swirl element is an individual structural element, its handling in the manufacturing process should not give rise to any limitations.

In comparison to swirl bodies, which have grooves or similar swirl-generating indentations on an end face, it is possible, using the simplest of means, to create in the swirl element an interior opening area, which extends over the entire axial thickness of the swirl element and is surrounded by an exterior circumferential edge area.

BRIEF DESCRIPTION OF THE DRAWINGS

FIG. 5 depicts a second exemplary embodiment in a representation by analogy to

FIG. 4.

DETAILED DESCRIPTION

Figure 1:
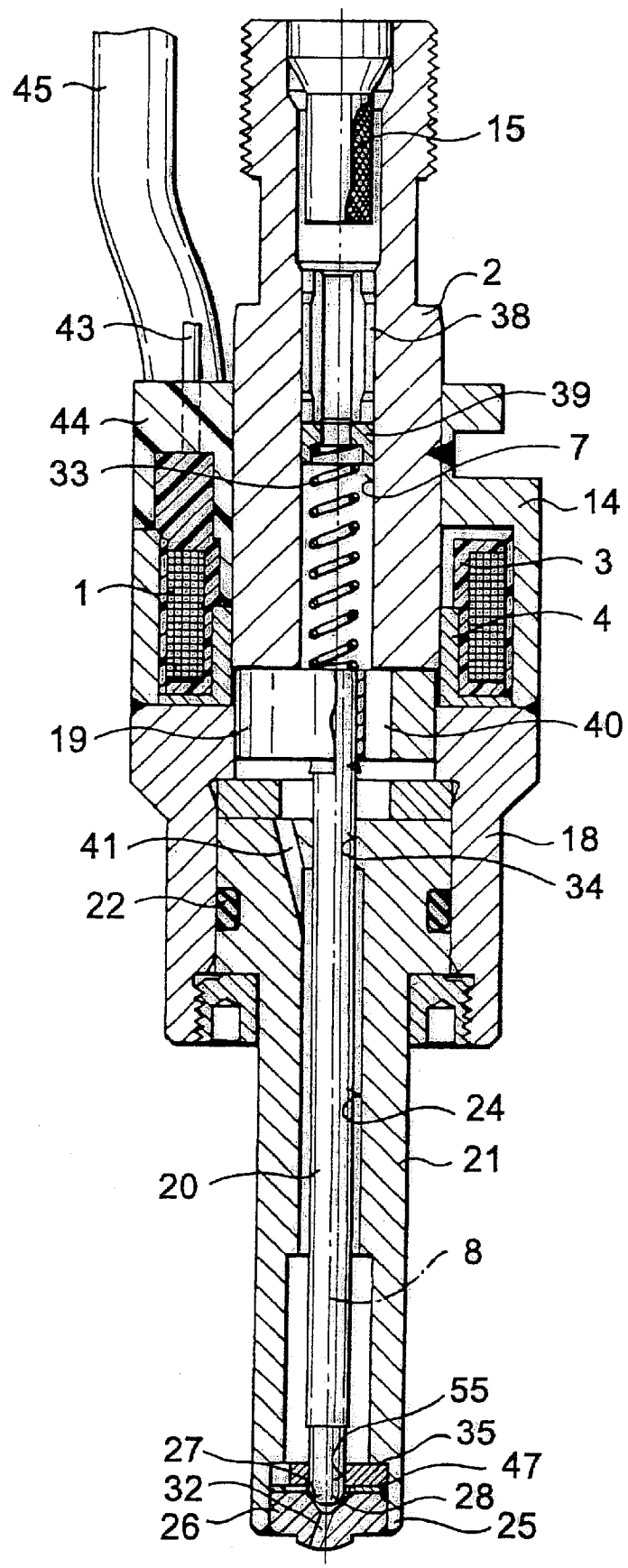
FIG. 1 depicts an exemplary embodiment of a fuel injector.

The electromagnetically actuated valve depicted in FIG. 1, by way of example, as an exemplary embodiment in the form of an injector for fuel injection systems of spark-ignition internal combustion engines, has a tubular, substantially hollow cylindrical core 2, functioning as the internal pole of a magnetic circuit and at least partially surrounded by a solenoid coil 1. The fuel injector is particularly well-suited as a high-pressure injector for the direct injection of fuel into a combustion chamber of an internal combustion engine. A coil shell 3, e.g., stepped, made of plastic, accommodates a winding of solenoid coil 1 and, in connection with core 2 and an annular, non-magnetic intermediate part 4, being partially surrounded by solenoid coil 1 and having an L-shaped cross-section, makes it possible to design the injector in the area of solenoid coil 1 so as to be particularly compact and short.

In core 2, a traversing longitudinal opening 7 is provided, which extends along a valve longitudinal axis 8. Core 2 of the magnetic circuit also functions as a fuel intake support, longitudinal opening 7 representing a fuel supply channel. Fixedly connected to core 2 above solenoid coil 1 is an external metallic (e.g., ferritic) housing part 14, that, as the external pole or the external conductive element, closes the magnetic circuit and completely surrounds solenoid coil 1 at least in the circumferential direction. In longitudinal opening 7 of core 2, a fuel filter 15 is provided on the intake side, which functions to filter out those fuel components which could cause clogging or damage in the injector due to their size. Fuel filter 15 is fixed in core 2, e.g., by pressing-in.

Core 2 along with housing part 14 forms the intake-side end of the fuel injector, upper housing part 14 extending, for example, straight downstream in the axial direction beyond solenoid coil 1. Connected to upper housing part 14 in a sealing and fixed manner is a lower tubular housing part 18, which surrounds and accommodates, for example, an axially movable valve part composed of an armature 19 and a bar-like valve needle 20, or an elongated valve seat support 21. Both housing parts 14 and 18 are fixedly joined to each other, e.g., in a circumferential welded seam.

In the exemplary embodiment depicted in FIG. 1, lower housing part 18 and substantially tubular valve seat support 21 are fixedly joined to each other by a threaded joint; however, welding, soldering, or flanging also represent equally possible jointing methods. The seal between housing part 18 and valve seat support 21 is effected, e.g., using a sealing ring 22. Valve seat support 21 over its entire axial extension has an interior feed-through opening 24 running concentrically with respect to valve longitudinal axis 8.

At its lower end 25, which also represents the downstream termination of the entire fuel injector, valve seat support 21 surrounds a disk-shaped valve seat element 26, pressed-in in feed-through opening 24 and having a valve seat surface 27 that tapers downstream in a truncated cone shape. Arranged in feed-through opening 24 is valve needle 20, for example, being bar-like and having a substantially circular cross section, and having at its downstream end a valve closing segment 28. This valve closing segment 28, which can be shaped in a spherical, partially spherical, or rounded-off manner, or which can taper in a cone-like manner, cooperates in a familiar way with valve seat surface 27 provided in valve seat element 26. Downstream of valve seat surface 27, in valve seat element 26, an outlet opening 32 is introduced for the fuel.

The injector is actuated, in a familiar manner, electromagnetically. A piezo actuator is nevertheless also conceivable as an excitable activating element. Similarly, actuation is conceivable via a piston that is pressure-impacted in a controlled manner. The electromagnetic circuit having solenoid coil 1, core 2, housing parts 14 and 18, and armature 19 functions to bring about the axial movement of valve needle 20 and therefore to open it against the spring force of a re-setting spring 33, arranged in longitudinal opening 7 of core 2, or to close the injector. Armature 19 is connected to the end of valve needle 20 facing away from valve closing segment 28, for example, by a welded seam, and it is aligned with respect to core 2. For guiding valve needle 20 during its axial motion together with armature 19 along valve longitudinal axis 8, there are, on the one hand, a guide opening 34 provided in valve seat support 21 at the end facing armature 19, and, on the other hand, a disk-shaped guide element 35 arranged upstream of valve seat element 26 and having a dimensionally accurate guide opening 55. Armature 19 during its axial motion is surrounded by intermediate part 4.

Arranged between guide element 35 and valve seat element 26 is a further disk-shaped element, specifically a swirl element 47, so that all three elements 35, 47, and 26 are situated directly one on top of the other and are accommodated in valve seat support 21. Three disk-shaped elements 35, 47, and 26 are fixedly joined to each other, for example, in an integral manner.

An adjusting sleeve 38, inserted, pressed-in, or screwed-in in longitudinal opening 7 of core 2, functions to adjust the spring prestressing of re-setting spring 33 in contact on its downstream side with adjusting sleeve 38 via a centering piece 39, the re-setting spring being supported at its opposite side on armature 19. In armature 19, one or a plurality of bore-hole-like flow channels 40 are provided, through which the fuel can arrive in feed-through opening 24 from longitudinal opening 7 in core 2 via connecting channels 41 configured downstream of flow channels 40 in the vicinity of guide opening 34 in valve seat support 21.

The stroke of valve needle 20 is determined by the installation position of valve seat element 26. An end position of valve needle 20, when solenoid coil 1 is not excited, is stipulated by the position of valve closing segment 28 on valve seat surface 27 of valve seat element 26, whereas the other end position of valve needle 20, when solenoid coil 1 is excited, results from the position of armature 19 on the downstream end face of core 2. The surfaces of the components in the aforementioned limit stop area are, for example, chromium-plated.

The electrical contacting of solenoid coil 1, and therefore its excitation, is carried out via contact elements 43, which are provided with a plastic extrusion coat 44 outside coil shell 3. Plastic extrusion coat 44 can also extend over further components (e.g., housing parts 14 and 18) of the fuel injector. An electrical connecting cable 45 runs from plastic extrusion coat 44, making possible the provision of current to solenoid coil 1. Plastic extrusion coat 44 extends through upper housing part 14, which is interrupted in this area.

Figure 2:
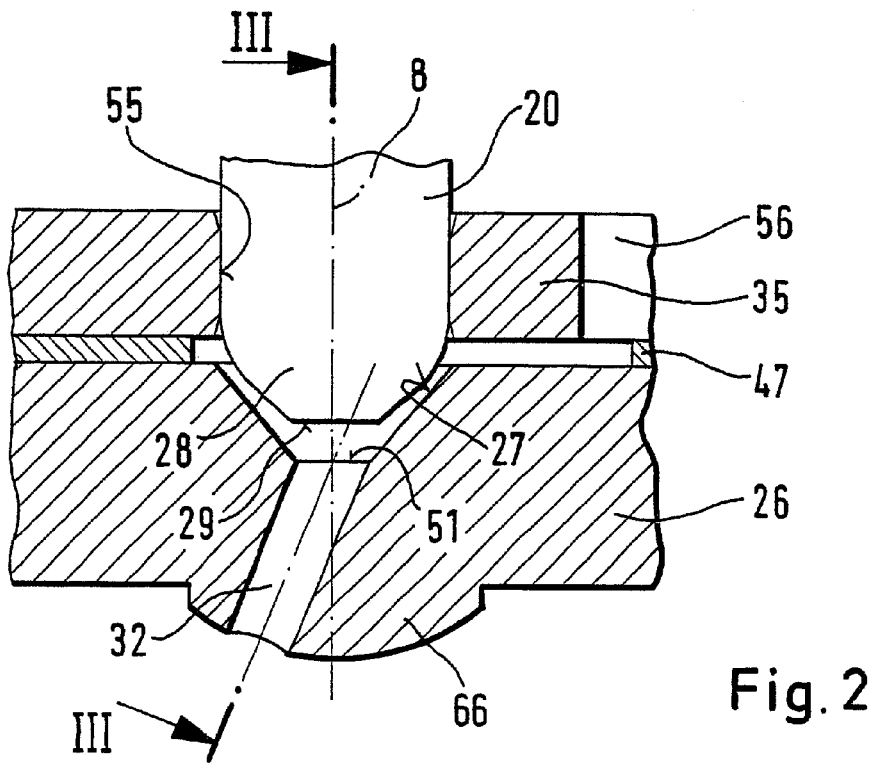
FIG. 2 depicts a cutaway view of the downstream valve end.
Figure 3:
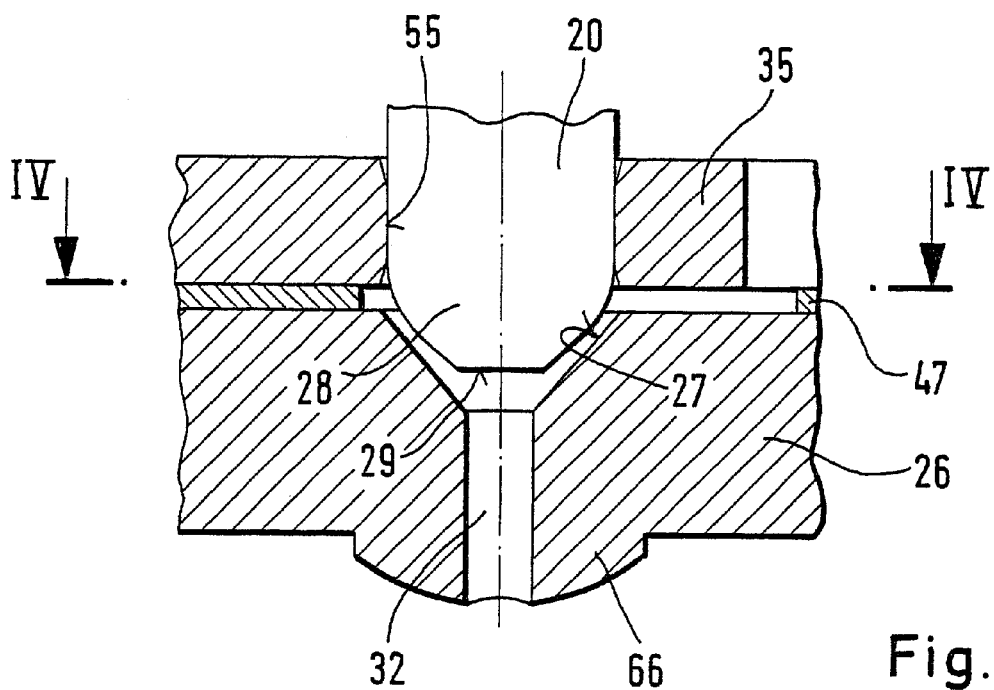
FIG. 3 depicts a cutaway view along the line III—III in FIG. 2.

FIG. 2 depicts a cutaway view of the downstream valve end of the valve according to FIG. 1. Valve seat surface 27 forms a conical section in valve seat element 26, which at its downstream end emerges in a base area 51 having a small diameter. From this base area 51, outlet opening 32 immediately extends in the downstream direction. Outlet opening 32, in this context, does not run parallel to valve longitudinal axis 8. Rather, outlet opening 32 extends diagonally with respect to valve longitudinal axis 8 in the downstream direction, away from it, the central point of the intake plane of outlet opening 32 lying on valve longitudinal axis 8 and the central point of the outlet plane of outlet opening 32 lying away from valve longitudinal axis 8. Outlet opening 32 terminates, for example, in a convex, curved spray-discharge area 66. FIG. 3 depicts a cutaway view along line III—III in FIG. 2, illustrating that outlet opening 32 begins in the center of base area 51.

Guide element 35 has a dimensionally accurate interior guide opening 55, through which valve needle 20 moves during its axial motion. From the exterior periphery, guide element 35 has a plurality of recesses 56 distributed over the circumference, guaranteeing the flow of fuel along the exterior periphery of guide element 35 into swirl element 47 and, further, in the direction of valve seat surface 27.

Valve closing segment 28, as the downstream end of valve needle 20, terminates downstream in a flattened-off area 29, which is realized in a planar fashion and runs perpendicular to valve longitudinal axis 8. Flattened-off area 29 can be a planar ground surface.

Figure 4:
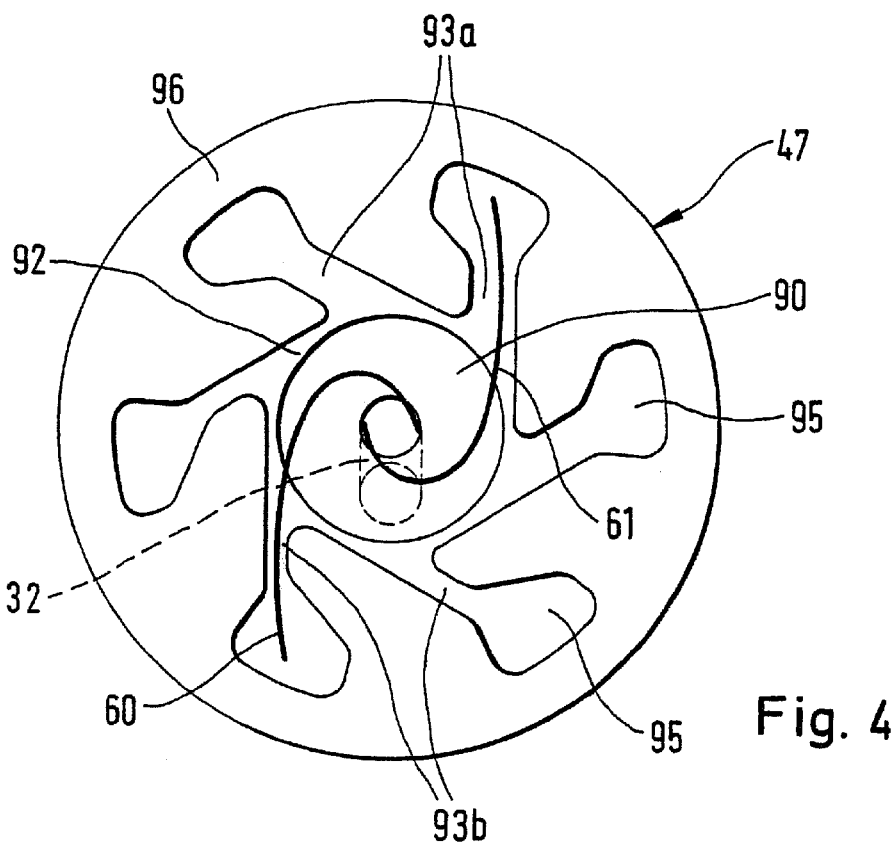
FIG. 4 depicts a cutaway view along the line IV—IV in FIG. 3 and thus a top view of a swirl element as a first exemplary embodiment according to the present invention.

In FIG. 4, a cutaway view along line IV—IV in FIG. 3 is depicted, and thus a top view of swirl element 47, as a first exemplary embodiment according to the present invention. Swirl element 47 can be manufactured from sheet metal in a cost-effective manner, for example, using stamping, wire eroding, laser cutting, etching, or other known methods, or through electroplating deposition. In swirl element 47, an interior opening area 90 is shaped which runs over the entire axial thickness of swirl element 47. Opening area 90 is formed by an interior swirl chamber 92, through which valve closing segment 28 of valve needle 20 extends, and by a multiplicity of swirl channels 93a, 93b discharging into swirl chamber 92. Swirl channels 93a, 93b discharge tangentially into swirl chamber 92, and their ends 95 facing away from swirl chamber 92 are not in connection with the exterior periphery of swirl element 47. Rather, a circumferential edge area 96 remains between ends 95 of swirl channels 93a, 93b, configured as intake pockets, and the exterior periphery of swirl element 47.

When valve needle 20 is installed, swirl chamber 92 is bordered to the inside by valve needle 20 (valve closing segment 28) and to the outside by the wall of opening area 90 of swirl element 47. As a result of the tangential discharge of swirl channels 93a, 93b into swirl chamber 92, the fuel receives an angular momentum that is maintained in the further flow right up to outlet opening 32. As a result of centrifugal force, the fuel is spray-discharged in a substantially hollow-cone shape. Ends 95 of swirl channels 93a, 93b function as collecting pockets, which over a large surface constitute a reservoir for the turbulence-poor flow of the fuel. After the deflection of the flow, the fuel flows slowly and without turbulence into actual tangential swirl channels 93a, 93b, as a result of which a swirl can be generated that is essentially disturbance-free.

Figure 5:
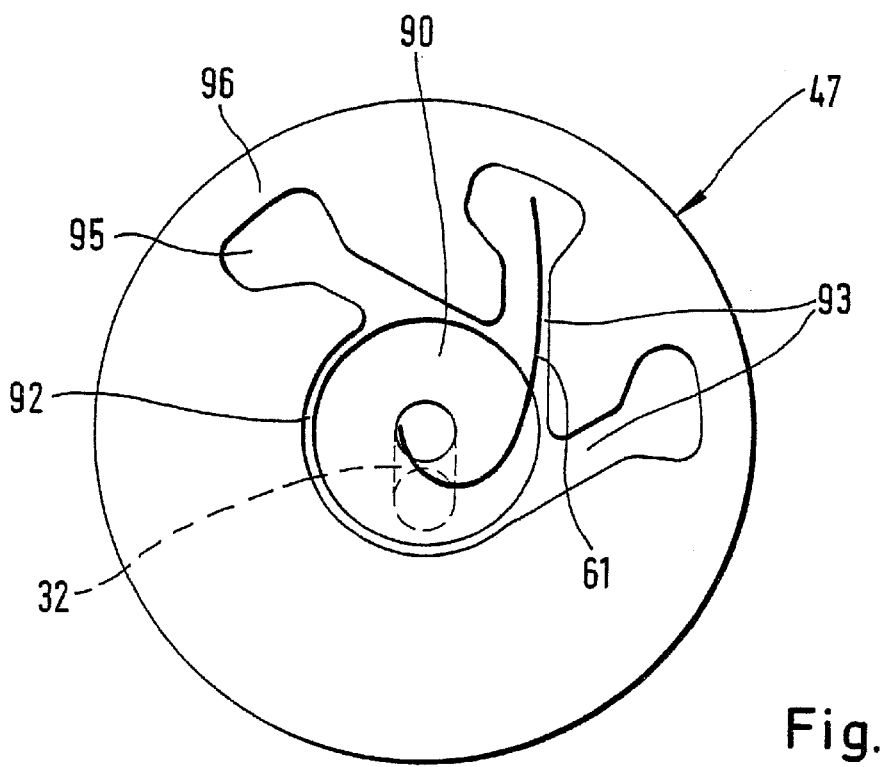

According to the present invention, swirl channels 93a, 93b are arranged non-uniformly over the periphery of swirl element 47, which means that swirl channels 93a, 93b either are introduced having different geometries but substantially uniform distribution over 360° (FIG. 4), or swirl channels 93 are actually distributed non-uniformly over the periphery (FIG. 5).

In what follows, the background of such considerations is discussed. It is desirable, particularly for the use of fuel injectors for so-called direct fuel injection, to inject swirling sprays, in hollow-cone form, diagonally into the combustion chamber of an internal combustion engine. If outlet opening 32, in a correspondingly desirable manner, is introduced so as to be diagonal with respect to valve longitudinal axis 8 in the case of a uniform swirl stream, then the problem arises that the fuel flow in angled outlet opening 32 is not distributed uniformly over the periphery, and as a consequence, a very non-uniform fuel spray emerges over the periphery. This phenomenon can be dealt with, as is known from German Patent Application 197 57 29, by introducing outlet opening 32 so that it is offset with regard to valve longitudinal axis 8.

On the basis of the solutions according to the present invention, the particular design shape for avoiding the above-mentioned problem should be executed independently of valve seat element 26 or outlet opening 32, and the difficult task of introducing a precise, diagonal, and off-center outlet opening 32 should be avoided.

On the basis of particle orbits 60, 61, symbolically depicted in FIG. 4, it is explained how the solution of the problem of the non-uniform spray in diagonally discharging valves is achieved by a particular form design of swirl element 47. Swirl element 47 is realized such that swirl channels 93a on the side opposite the spray-discharge direction indicated by the angle of outlet opening 32 have a larger width than swirl channels 93b, which substantially lie on the side of the angle-affected spray-discharge direction. Accordingly, swirl element 47 is aligned precisely with respect to valve seat element 26 and thus is aligned in the direction of inclination of outlet opening 32. Due to the tangential flow, it is precisely the fuel from narrower swirl channels 93b, as particle orbit 60 shows, that enters into outlet opening 32 in the spray-discharge direction. On the other hand, the fuel from wider swirl channels 93a reaches outlet opening 32 contrary to the latter's direction of inclination (particle orbit 61). In this manner, the flow on particle orbit 60 towards outlet opening 32 is impeded, but is favored by the angle of outlet opening 32. When the width of swirl channels 93a, 93b is correctly coordinated, a uniform peripheral distribution of the spray is achieved. By way of example, three of each swirl channel 93a and 93b can be provided. On the other hand, the swirl channel widths can also be selected such that a spray arises over the periphery that is controllably non-uniform, if this is desired for an engine combustion process.

Instead of the non-uniform geometry of swirl channels 93a, 93b on the different sides of swirl element 47, swirl channels 93 can also be distributed in a non-uniform manner over the periphery, as is shown in FIG. 5. In this exemplary embodiment, by way of example, three swirl channels 93 are arranged over only approximately 180° on the side opposite the direction of inclination of outlet opening 32. When the geometric position and the size ratios of swirl channels 93 are correctly coordinated, then a very uniform spray, in a diagonal spray-discharge, can be produced using this embodiment. In general, in a non-uniform distribution of at least two swirl channels 93, there are at least two different circumferential distances between any two adjoining swirl channels 93. In the example in FIG. 5, the distances between the left and the center swirl channel 93 as well as between the center and the right swirl channel 93 are the same (in each case 90°), whereas the distance between the right and the left swirl channel 93 is significantly larger (>180°).

It should be emphasized that, on the basis of FIGS. 4 and 5, only two advantageous exemplary embodiments have been described, from which no general rules should be derived for the arrangement of swirl channels 93, 93a, 93b. It is therefore not necessarily the case that wide swirl channels 93a (FIG. 4) are arranged opposite the direction of inclination of outlet opening 32 or that, in the case of a non-uniform distribution, swirl channels 93 (FIG. 5) are arranged exclusively opposite the direction of inclination of outlet opening 32. In the arrangement of swirl channels 93, it is rather other factors that play a role, such as the geometry of swirl channels 93 or the diameter of outlet opening 32, on the basis of which, for example, the angle of propagation of the fuel spray to be spray-discharged is determined. Using these geometric dimensions, it is also determined through which angle sector the flow proceeds from individual swirl channel 93, 93a, 93b to its entry into outlet opening 32. Particle orbits 60, 61 make clear in FIGS. 4 and 5 that in the described exemplary embodiments, this angle is roughly 180°. If one takes the size of this flow angle sector on the basis of the direction of inclination of outlet opening 32 on the periphery in the direction opposite to the swirl, one arrives at the sector that advantageously has wider swirl channels 93a (FIG. 4), or any swirl channels 93 (FIG. 5). In the examples according to FIGS. 4 and 5, this sector, on the basis of the flow angle sector encompassing 180°, lies on the side opposite the direction of inclination of outlet opening 32. If, due to the specific geometries of swirl element 47 or of outlet opening 32, a flow angle sector encompassing other than 180° is present, then the result is logically different arrangements of swirl channels 93, 93, 93b than those depicted in FIGS. 4 and 5. In general, for an example having non-uniform geometry of swirl channels 93a, 93b, it holds that wide swirl channels 93a in swirl element 47 should be situated so that, taking into account the flow angle sector, a flow takes place into outlet opening 32 that is opposite to its direction of inclination. Narrower swirl channels 93b are accordingly located so that a flow in the direction of inclination of outlet opening 32 is assured. For examples having a non-uniform distribution of swirl channels 93, swirl channels 93 are situated such that, taking into account the flow angle sector, a flow into outlet opening 32 is assured that is contrary to its direction of inclination.

In FIGS. 6 through 10, a plurality of exemplary embodiments of valve needle ends is depicted, which indicate a second group of proposed solutions according to the present invention with respect to the above-mentioned problem. Just as in the examples according to FIGS. 1 through 3, outlet openings 32 are situated diagonally with respect to valve longitudinal axis 8 and are furnished with an intake plane whose central point is located on valve longitudinal axis 8. Swirl element 47, however, in contrast to the preceding examples, is realized in a uniform manner without contour differences in individual swirl channels 93.

Figure 6:
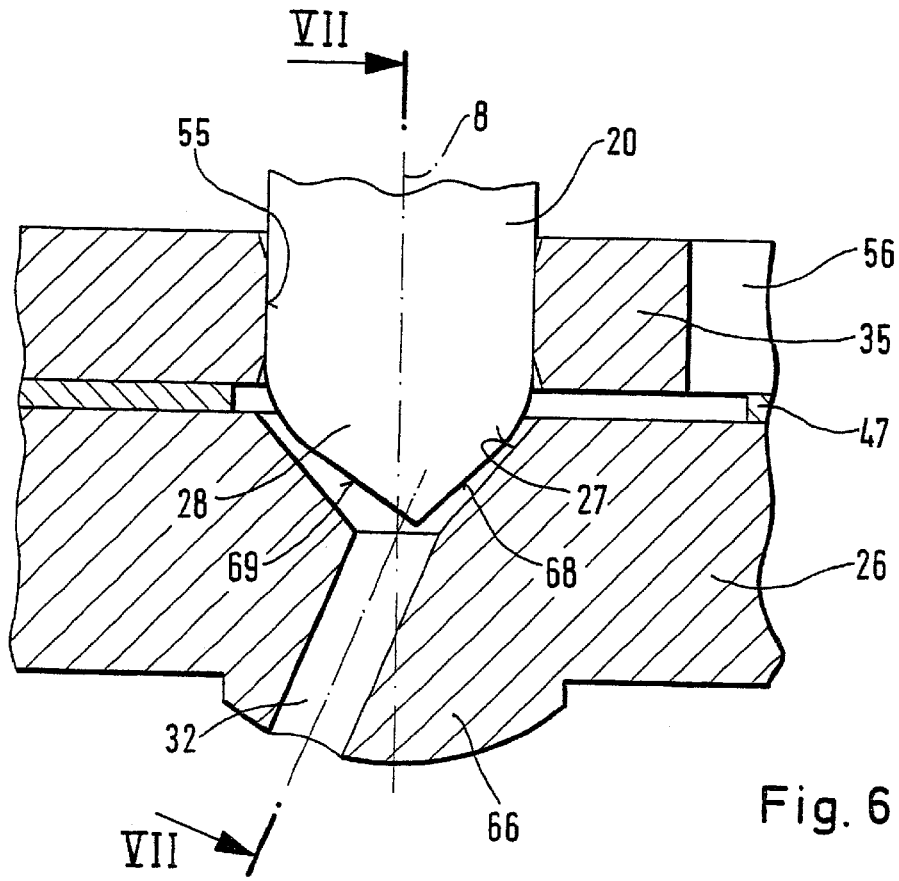
FIG. 6 depicts a third exemplary embodiment in a representation by analogy to FIG. 2.
Figure 7:
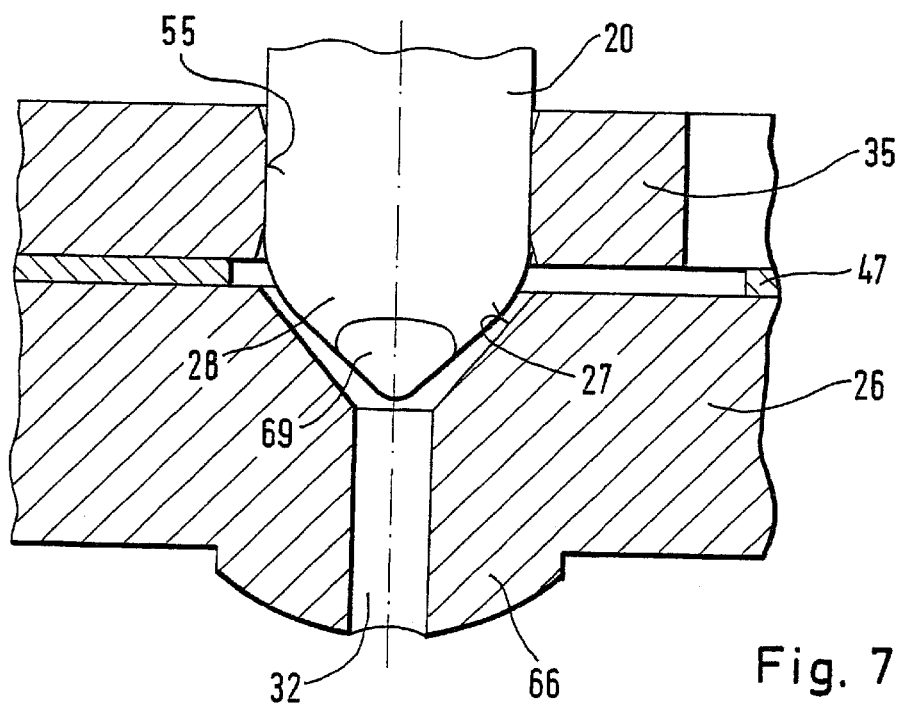
FIG. 7 depicts a cutaway view along the line VII—VII in FIG. 6.

FIG. 6 depicts an exemplary embodiment in a representation by analogy to FIG. 2, whereas FIG. 7 depicts a cutaway view along line VII—VII in FIG. 6. From FIG. 6, it can be seen that the downstream end of valve closing segment 28 and therefore of entire valve needle 20 is not uniformly configured over its periphery. Rather, a conical section 68 of valve closing segment 28 is furnished on one side with a flattened-off area 69. Flattened-off area 69, in this context, is located roughly on the side of valve closing segment 28 in the direction of which outlet opening 32 is angled. Downstream of the line at which valve closing segment 28 contacts valve seat surface 27 when the valve is closed, valve needle 20 has conical section 68, whose conical angle is slightly larger than the conical angle of valve seat surface 27 of the conical section in valve seat element 26.

Figure 10:
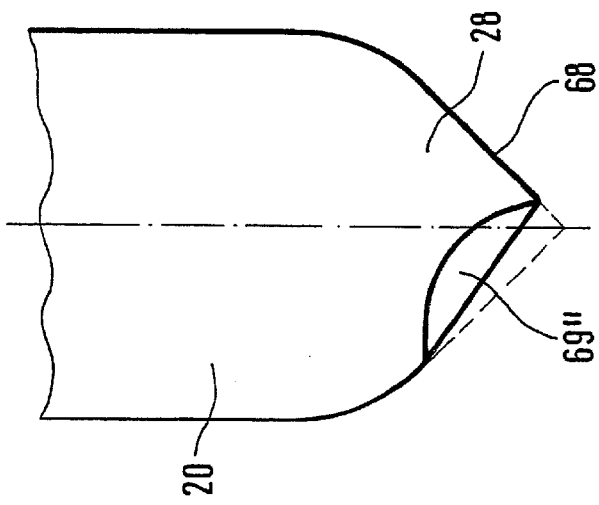
FIG. 10 depicts a further exemplary embodiment of a valve needle point.
Figure 9:
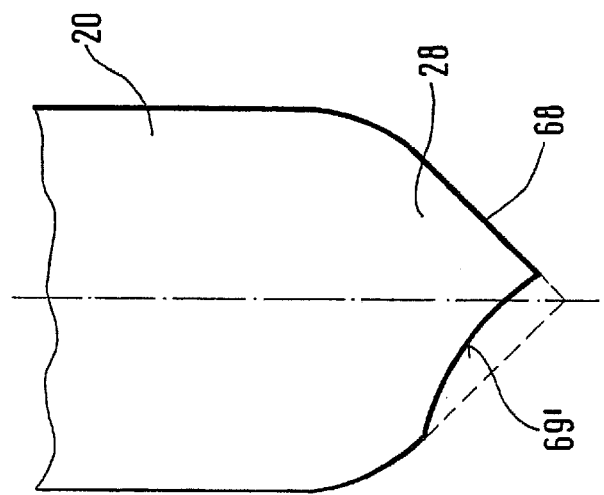
FIG. 9 depicts a different exemplary embodiment of a valve needle point.
Figure 8:
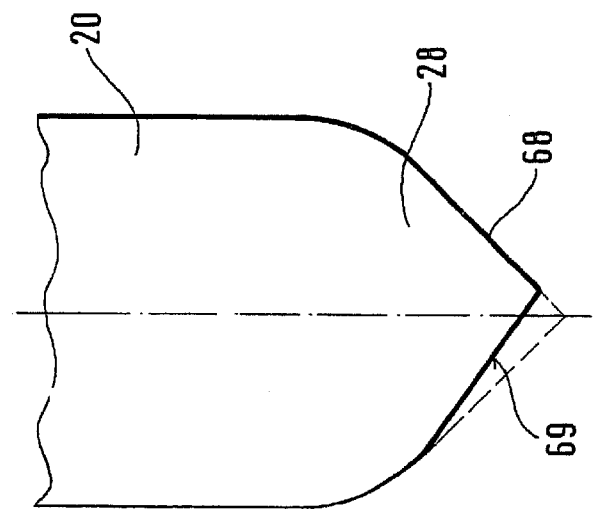
FIG. 8 depicts the valve needle points according to FIGS. 6 and 7 in an enlarged view.

As a result of the, e.g., ground areas, in this region of conical section 68, surfaces are produced in various variants. In FIGS. 8 through 10, three variants of this type are depicted, the valve needle point in FIG. 8 depicting the one shown in FIG. 6 in an enlargement. The shaped surface in FIG. 8 is a diagonal, planar flattened-off area 69, whereas in the examples of FIGS. 9 and 10, the shapes are more diagonal, curved, concave hollowed-out areas 69', 69". Hollowed-out area 69" can be produced such that flattened-off area 69, or hollowed-out area 69', according to FIGS. 8 and 9 is produced on a larger partial periphery in conical section 68.

Valve needle 20, in its ground flattened-off area 69, or hollowed-out area 69', 69", is fixedly aligned with respect to outlet opening 32 regarding its rotational position. In this context, the alignment is such that the flow that arrives at outlet opening in its direction of inclination is impeded by a relatively narrow gap between conical section 68 and valve seat surface 27. The flow that arrives at outlet opening 32 in opposition to its direction of inclination flows through a wider gap between conical section 68 and valve seat surface 27, due to flattened-off area 69, or hollowed-out area 69', 69", and it provides in this way a desirable compensation for the non-uniform distribution in the spray-discharged hollow-cone spray that would otherwise arise as a result of the angle of outlet opening 32.

In a further undepicted embodiment, the intake plane of angled outlet opening 32 can be configured so as to be slightly offset with respect to valve longitudinal axis 8. In a design of this type, the features of the off-centeredness of outlet opening 32, in combination with swirl channels 93, distributed unevenly or having non-uniform geometries or with the asymmetrical valve needle ends, make possible the solution according to the present invention of the problem depicted above.

Finally, it should be emphasized that the present invention is not limited to depicted and described swirl disks 47 as the swirl-generating elements. The swirl-generating elements also include swirl channels, swirl grooves, and swirl bore holes, which can be introduced, for example, on the periphery of the valve needle, in a nozzle body, or in special swirl inserts.

What is claimed is:

1. A fuel injector for a fuel injection system of an internal combustion engine, comprising:

an excitable activation element;
a valve seat element including an outlet opening;
a fixed valve seat arranged on the valve seat element, the outlet opening being located downstream of the fixed valve seat;
a valve needle arranged with respect to the excitable activation element and being moveable axially along a valve longitudinal axis, the valve needle including a downstream end that includes a valve closing segment, the valve closing segment cooperating with the fixed valve seat for opening and closing a valve; and
a swirl element arranged upstream of the fixed valve seat and including a plurality of swirl channels distributed over a periphery, wherein:
the outlet opening runs diagonally with respect to the valve longitudinal axis and is arranged with respect to a direction of inclination, and
the plurality of swirl channels includes one of different geometries and different dimensions.

2. The fuel injector according to claim 1, wherein:
the fuel injector is for a direct injection of a fuel into a combustion chamber of the internal combustion engine.

3. The fuel injector according to claim 1, wherein:
a first amount of the plurality of swirl channels is formed over a first angle sector from a point of view of a circumferential direction,
a second amount of the plurality of swirl channels is formed over a second angle sector and includes a smaller width than those of the first amount of the plurality of swirl channels, and
the first angle sector and the second angle sector total 360°.

4. The fuel injector according to claim 3, wherein:
at least one of the plurality of swirl channels having the smaller width is arranged on a side of the direction of inclination of the outlet opening.

5. The fuel injector according to claim 1, wherein:
the outlet opening includes an intake plane having a central point lying on the valve longitudinal axis.

6. The fuel injector according to claim 1, wherein:
the swirl element includes a disk-shaped swirl element.

7. The fuel injector according to claim 1, wherein:
the swirl element, immediately upstream of the valve seat element, abuts against the valve seat element.

8. A fuel injector for a fuel injection system of an internal combustion engine, comprising:

an excitable activation element;
a valve seat element including an outlet opening;
a fixed valve seat arranged on the valve seat element, the outlet opening being located downstream of the fixed valve seat;
a valve needle arranged with respect to the excitable activation element and being moveable axially along a valve longitudinal axis, the valve needle including a downstream end that includes a valve closing segment, the valve closing segment cooperating with the fixed valve seat for opening and closing a valve; and
a swirl element arranged upstream of the fixed valve seat and including a plurality of swirl channels distributed over a periphery, wherein:
the outlet opening runs diagonally with respect to the valve longitudinal axis and is arranged with respect to a direction of inclination, and
the plurality of swirl channels is distributed non-uniformly over a periphery such that at least two different peripheral distances exist between adjoining ones of the plurality of swirl channels.

9. The fuel injector according to claim 8, wherein:

the fuel injector is for a direct injection of a fuel into a combustion chamber of the internal combustion engine.

10. The fuel injector according to claim 8, wherein:

the plurality of swirl channels is formed over an angle sector encompassing roughly 180° from a point of view of a circumferential direction, and a remaining angle sector includes none of the plurality of swirl channels.

11. The fuel injector according to claim 8, wherein:

none of the plurality of swirl channels is provided on a side of the direction of inclination of the outlet opening, and at least two of the plurality of swirl channels are provided on an opposite side.

12. The fuel injector according to claim 8, wherein:

the outlet opening includes an intake plane having a central point lying on the valve longitudinal axis.

13. The fuel injector according to claim 8, wherein:

the swirl element includes a disk-shaped swirl element.

14. The fuel injector according to claim 8, wherein:

the swirl element, immediately upstream of the valve seat element, abuts against the valve seat element.

15. A fuel injector for a fuel injection system of an internal combustion engine, comprising:

an excitable activation element;

a valve seat element including an outlet opening;

a fixed valve seat arranged on the valve seat element, the outlet opening being located downstream of the fixed valve seat;

a valve needle arranged with respect to the excitable activation element and being moveable axially along a valve longitudinal axis, the valve needle including a downstream end that includes a valve closing segment, the valve closing segment cooperating with the fixed valve seat for opening and closing a valve; and a swirl element arranged upstream of the fixed valve seat and including a plurality of swirl channels distributed over a periphery, wherein:

the outlet opening runs diagonally with respect to the valve longitudinal axis and is arranged with respect to a direction of inclination, and the valve closing segment of the valve needle includes one of a diagonal flattened-off area and a hollowed-out area for generating an asymmetry.

16. The fuel injector according to claim 15, wherein:

the fuel injector is for a direct injection of a fuel into a combustion chamber of the internal combustion engine.

17. The fuel injector according to claim 15, wherein:

the one of the flattened-off area and the hollowed-out area is formed on a side of the direction of inclination of the outlet opening.

18. The fuel injector according to claim 15, wherein:

the hollowed-out area is curved in a concave manner.

19. The fuel injector according to claim 15, wherein:

the valve closing segment corresponds to a conical section and runs to a conical point in a direction of flow.

20. The fuel injector according to claim 15, wherein:

the outlet opening includes an intake plane having a central point lying on the valve longitudinal axis.

21. The fuel injector according to claim 15, wherein:

the swirl element includes a disk-shaped swirl element.

22. The fuel injector according to claim 15, wherein:

the swirl element, immediately upstream of the valve seat element, abuts against the valve seat element.

* * * * *

UNITED STATES PATENT AND TRADEMARK OFFICE
CERTIFICATE OF CORRECTION

PATENT NO. : 6,382,533 B1  Page 1 of 1
DATED : May 7, 2002
INVENTOR(S) : Martin Mueller et al.

It is certified that error appears in the above-identified patent and that said Letters Patent is hereby corrected as shown below:

Column 1,
Line 6, change "BACKGROUND OF THE INVENTION" to -- BACKGROUND INFORMATION --
Line 7, change "published" to -- PUBLISHED --
Line 26, change "invention," to -- invention --

Column 5,
Line 31, change "known from German" to -- described in German Published --
Line 32, change "Application 1975729" to -- Application No. 19757299 --

Signed and Sealed this

Twenty-sixth Day of August, 2003

JAMES E. ROGAN
*Director of the United States Patent and Trademark Office*